Figure 1:
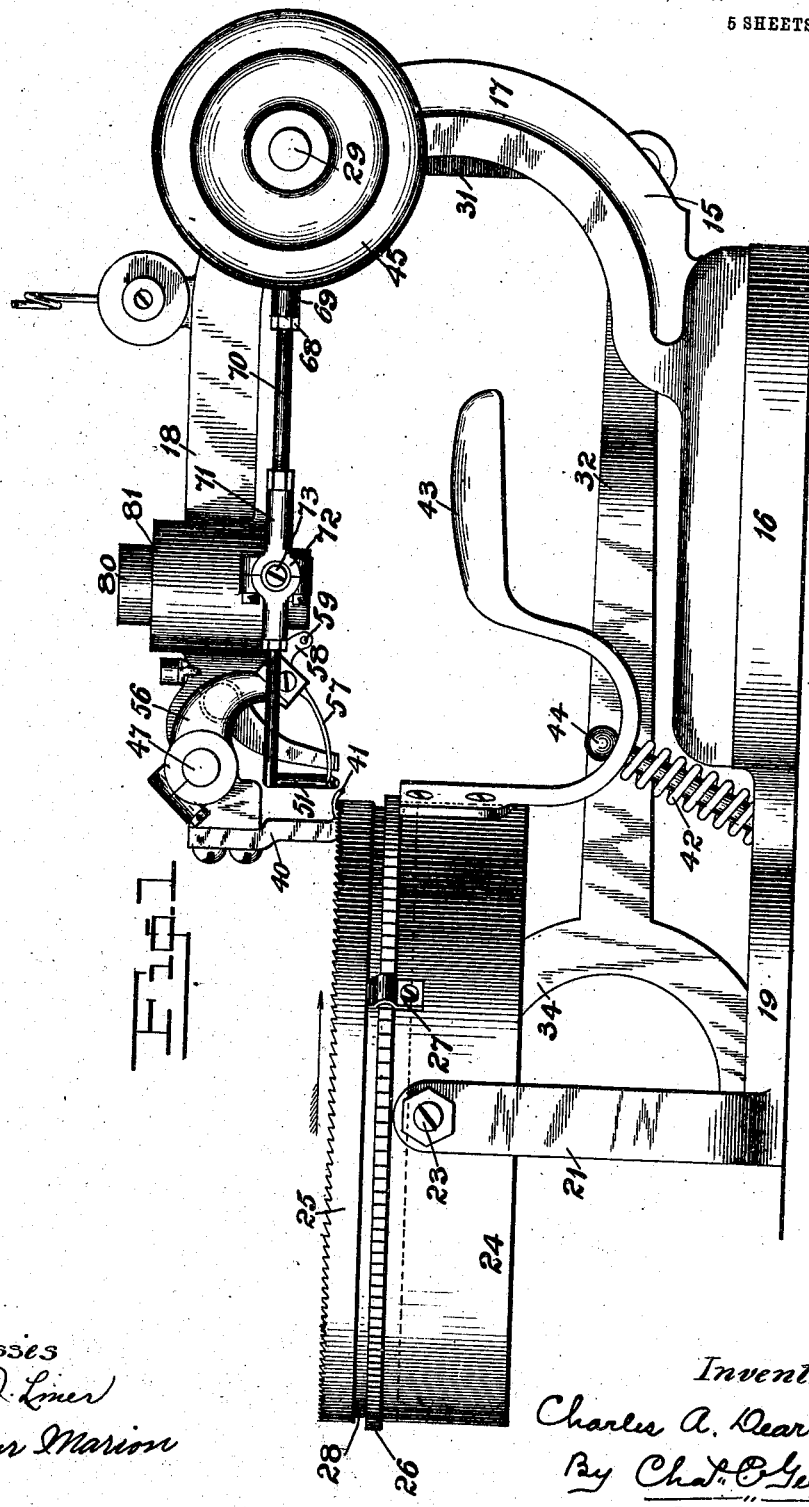

No. 894,819. PATENTED AUG. 4, 1908.
C. A. DEARBORN.
SEWING MACHINE.
APPLICATION FILED JULY 9, 1902. RENEWED DEC. 12, 1907.

5 SHEETS—SHEET 1.

Witnesses
Jos. I. Liner
Arthur Marion

Inventor
Charles A. Dearborn
By Chas. E. Gill
Attorney.

No. 894,819. PATENTED AUG. 4, 1908.
C. A. DEARBORN.
SEWING MACHINE.
APPLICATION FILED JULY 9, 1902. RENEWED DEC. 12, 1907.

5 SHEETS—SHEET 3.

Witnesses
Jos. I. Liner
Arthur Marion

Inventor
Charles A. Dearborn,
By Chas. C. Gill
attorney.

No. 894,819. PATENTED AUG. 4, 1908.
C. A. DEARBORN.
SEWING MACHINE.
APPLICATION FILED JULY 9, 1902. RENEWED DEC. 12, 1907.
5 SHEETS—SHEET 4.
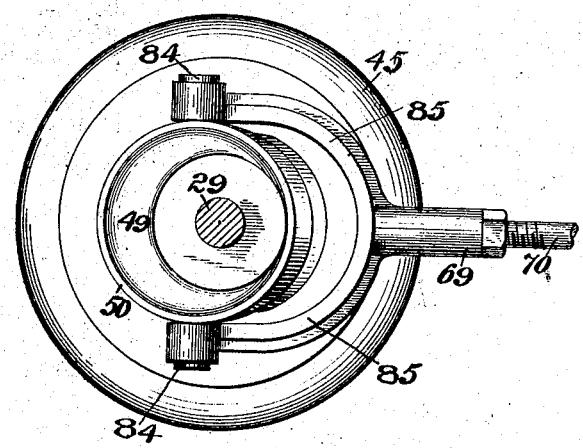
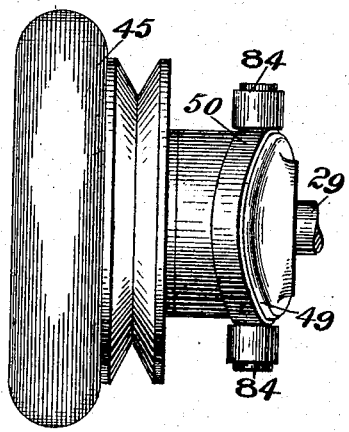
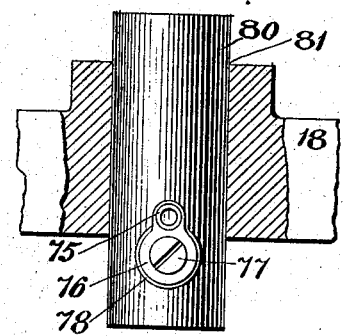
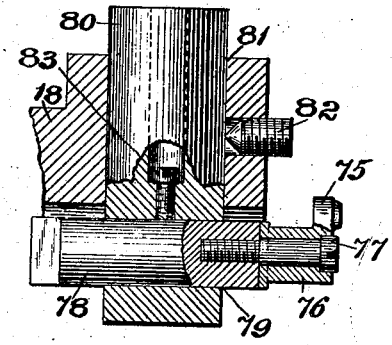
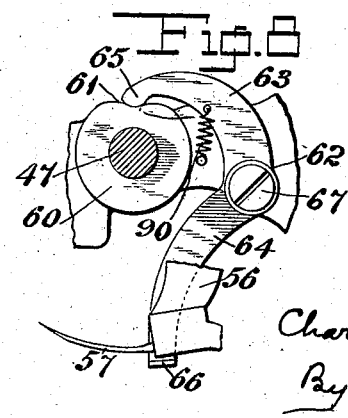
Witnesses
Jos. I. Liner
Arthur Marion
Inventor.
Charles A. Dearborn,
By Chas. C. Gill
Attorney.

No. 894,819.　　　　　　　　　　　　　PATENTED AUG. 4, 1908.
C. A. DEARBORN.
SEWING MACHINE.
APPLICATION FILED JULY 9, 1902. RENEWED DEC. 12, 1907.
5 SHEETS—SHEET 5.
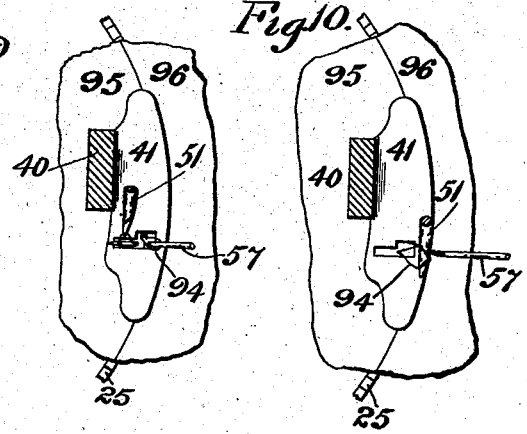
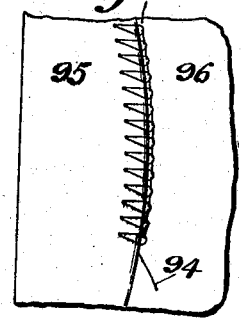
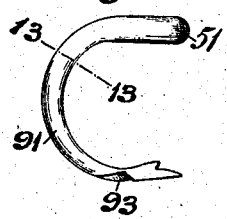
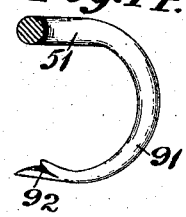
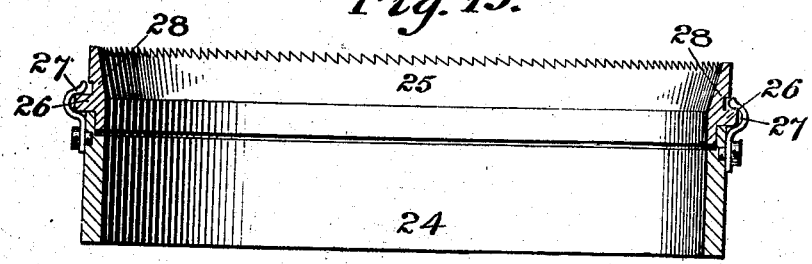
Witnesses
Jos. I. Liner
Arthur Marion
Inventor
Charles A. Dearborn,
By Chas. E. Gill
Attorney

UNITED STATES PATENT OFFICE.

CHARLES A. DEARBORN, OF NEW YORK, N. Y., ASSIGNOR, BY MESNE ASSIGNMENTS, TO EMPIRE MACHINE COMPANY, OF PROVIDENCE, RHODE ISLAND, A CORPORATION OF RHODE ISLAND.

SEWING-MACHINE.

No. 894,819.   Specification of Letters Patent.   Patented Aug. 4, 1908.

Application filed July 9, 1902, Serial No. 114,875. Renewed December 12, 1907. Serial No. 406,201.

*To all whom it may concern:*

Be it known that I, CHARLES A. DEARBORN, a citizen of the United States, and a resident of New York, in the county of New York and State of New York, have invented certain new and useful Improvements in Sewing-Machines, of which the following is a specification.

The invention relates to improvements in sewing machines, and consists in the novel features, arrangement and combinations of parts hereinafter described and particularly pointed out in the claims.

I present my invention in this application as embodied in a hat sweat sewing machine comprising the needle mechanism, special looper actuating mechanism, a special looper and a novel means for feeding the hat along the point of sewing, said feeding means comprising as an essential feature, a positively driven circular ring or frame supporting the hat and effecting its intermittent feed motion along the point of sewing. The circular feed ring or frame for feeding the hat will be driven from the driving shaft of the machine, as by a pawl and ratchet mechanism, and preferably the said feed ring or frame will be supported within the upper edges of a tiltable but otherwise stationary circular frame equipped with a suitable handle by which it may be tilted, and a spring for pressing the edge of the feed ring or frame in a direction against the presser-foot.

The looper employed in my machine is of novel formation adapted to hold the loop in an extended condition to receive the point of the sewing needle, and the said looper derives its motion from the driving shaft through novel mechanism comprising an oblique eccentric carried by said shaft and a looper rod driven by said eccentric and supported by means of a ball and socket joint upon the end of a pin extending laterally from the upper end of an upwardly turned crank arm which will yield with the looper rod under the action of the latter when driven by the said oblique eccentric and which will permit the looper rod to have both a longitudinal and an angular motion.

The invention will be fully understood from the detailed description hereinafter presented, reference being had to the accompanying drawings, in which:—

Figure 2:
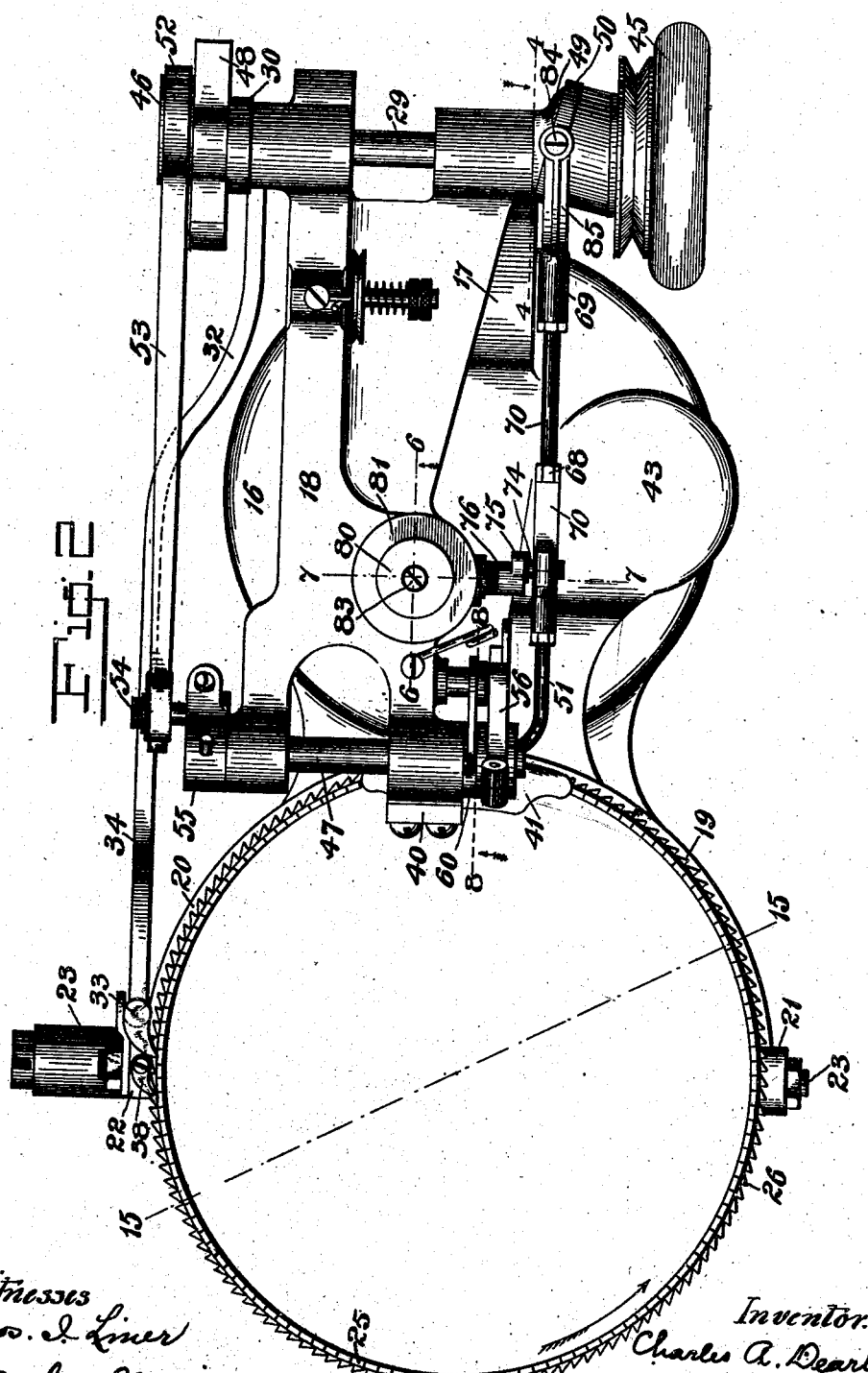
Figure 3:
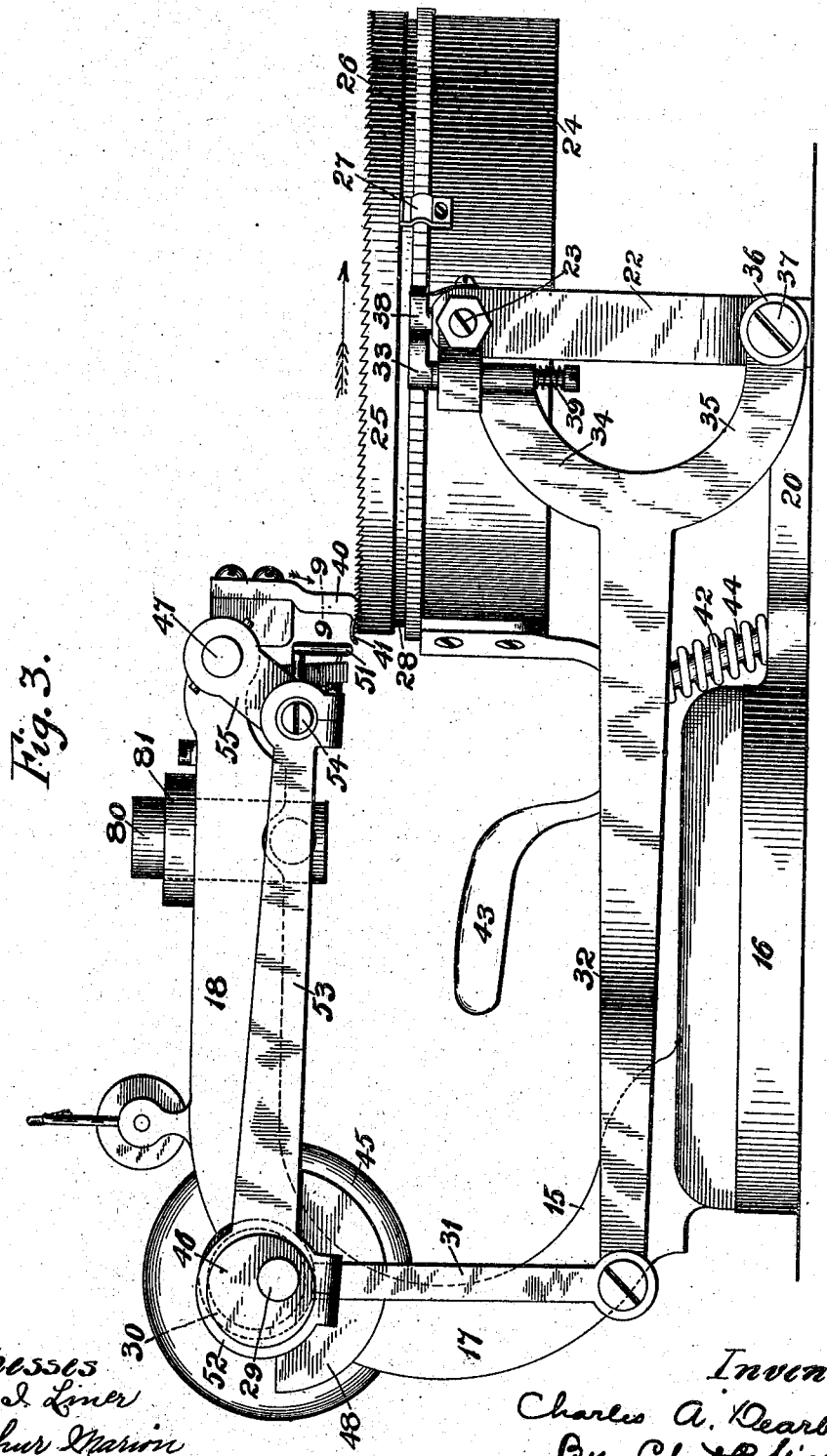

Figure 1 is a side elevation of a hat sweat sewing machine constructed in accordance with and embodying the invention; Fig. 2 is a top view of same; Fig. 3 is a side elevation of same, this figure showing the opposite side of the machine to that illustrated in Fig. 1; Fig. 4 is a detached sectional view through the driving shaft of the machine on the dotted line 4—4 of Fig. 2, and illustrating in end view the oblique eccentric for actuating the looper; Fig. 5 is a detached view of the driving wheel and oblique eccentric taken from the rear end of the machine, the driving shaft being broken away; Fig. 6 is a central vertical section through a portion of the frame of the machine on the dotted line 6—6 of Fig. 2 and illustrates in side elevation a vertically adjustable support for a crank arm, shown in end view, for coöperation with the looper rod; Fig. 7 is a vertical transverse section, partly broken away, of same, on the dotted line 7—7 of Fig. 2; Fig. 8 is a detached vertical section, partly broken away, of a portion of the needle mechanism on the dotted line 8—8 of Fig. 2; Fig. 9 is a detached horizontal section, partly broken away, of a portion of the machine on the dotted line 9—9 of Fig. 3, this view being presented to illustrate the point of the looper as about to enter the loop formed at the point of the needle at one side of the line of sewing; Fig. 10 is a view corresponding with Fig. 9 but showing the looper as having entered the loop and passed to the other side of the line of sewing and holding the loop open for the entrance of the needle to the same; Fig. 11 is a diagrammatic view illustrating in a somewhat exaggerated manner the character of the sewing performed by the machine; Fig. 12 is a detached front end view of the looper; Fig. 13 is a detached top view of the pointed end portion of the looper, this figure being a section on the dotted line 13—13 of Fig. 12; Fig. 14 is a detached view looking at the rear side of the front portion of the looper, the shank of the looper being in section and this figure showing the opposite side of the front portion of the looper to that illustrated in Fig. 12; Fig. 15 is a vertical section through the hat supporting and feeding mechanism on the dotted line 15—15 of Fig. 2.

In the drawings 15 denotes the general frame of the machine, this frame comprising the base 16 having at its rear end the integral member consisting of the vertical standard 17 and forwardly extending horizontal arm 18, and said base 16 having at its front end the forwardly projecting segmental arms 19, 20, at whose forward ends are the vertical standards 21, 22, which at their upper ends receive the screw trunnions 23 supporting upon their inner ends the circular frame 24, which is capable of having a tilting or rocking motion upon the said trunnions 23 but is otherwise stationary.

The frame 24 supports and guides the circular feed ring 25, which has a toothed upper edge to engage the hat, and an annular projecting shoulder 26 which rests upon the upper edge of the frame 24 and is formed with ratchet teeth throughout its entire extent. The lower edge of the feed ring 25 sets within the upper edges of the frame 24, while the said shoulder 26 rests upon the upper edge of said frame, and the feed ring 25 which is adapted to rotate upon the upper edge of the frame 24, is held in position upon the latter by means of the lips 27 (Figs. 1 and 3), which are fastened at their lower ends by screws to the frame 24 and at their upper ends pass around the annular shoulder 26 and enter an annular groove 28 formed in said ring 25 above said shoulder 26. The lips 27 by passing over the annular shoulder 26 prevent the ring 25 from escaping upward from the frame 24 but do not interfere with the intermittent rotation of said ring upon the upper edge of said frame.

The feed ring 25 receives its intermittent motion from the driving shaft 29 through the eccentric 30 thereon, the eccentric rod 31 (Fig. 3) connected at its upper end with said eccentric and at its lower end pivotally secured to the rod 32, the said rod 32 and the pawl 33, the latter being carried by the extension 34 at the front end of said rod 32 and being in engagement with the ratchet teeth on the annular shoulder 26 of said feed ring 25. The rod 32 extends frontwardly from the eccentric rod 31 and at the lower portion of its front end is formed with the extension 35 which is equipped with a bearing hub 36 mounted upon the horizontal stud 37. The eccentric rod 31 is given a substantially vertical movement from the eccentric 30, and the rod 32 is, by means of the rod 31, given an oscillatory or rocking motion on the stud 37, thereby causing the pawl 33 to have a forward and backward movement and enabling said pawl on its forward thrust to impart a limited rotary motion to the feed ring 25. While moving rearwardly the pawl 33 will slip over the ratchet teeth on the ring 25, and at such time the said ring will be prevented from having any reverse movement by means of a locking dog or pawl 38 pivotally secured upon the upper end of the vertical standard 22. The pawl 33 is secured upon the upper end of a pin 39 carried by the extension 34 of the rod 32, and upon this pin 39, as shown in Fig. 3, is provided a spring which acts to yieldingly press the engaging edge of the pawl 33 against the ratchet teeth of the shoulder 26. During the rotation of the driving shaft 29 the feed ring 25 is, by the means just described, given an intermittent rotary motion upon the upper edge of the circular frame 24 for the purpose of feeding the edges of the hat and hat sweat to the sewing mechanism.

Upon the front end of the horizontal arm 18 of the machine frame is secured a stationary presser-foot 40 having a concave lower end or lip 41 upward against which the inner or rear edge of the feed ring 25 presses, said feed ring 25 having a yielding or spring tension upward at its inner or rear edge against the said presser-foot owing to the interposition of the coiled spring 42 between the base of the general frame of the machine and the handle 43 (Fig. 1) fastened to the circular frame 24. The coiled spring 42 is held upon a pin 44 which extends freely through the handle 43, and the said spring is permitted to yieldingly press the inner or rear edge of the feed ring 25 upward against the presser-foot because of the fact that the circular frame 24 supporting said feed ring is pivotally mounted between the upper end of the standards 21, 22.

In the employment of the feed ring 25 the crown of the hat is pressed downward within said ring and the circular frame 24, and the brim of the hat is folded down upon the exterior sides of the said feed ring and frame, the then upper edges of the hat along the line of the inner edge of the brim and the outer edge of the hat sweat at the rear edge of the feed ring 25, being by means of the spring 42, held up against the concave lower edge of the lip 41 of the presser-foot 40. In order to enable the convenient application of the hat to the feed ring 25, below the presser-foot 40, I mount the circular frame 24 in a pivotal manner and provide said frame with the handle 43, the latter enabling the operator to press downward the inner or rear side of the frame 24 and ring 23, whereby a substantial clearance is secured between the upper edge of the ring 25 and the lower end of the presser-foot 40 for the introduction of the hat below said foot. The spring 42 exerts firm upward pressure against the frame 24, but the force of this spring may be readily overcome by the operator owing to the fact that the handle 43 is of substantial character and extends rearwardly to a sufficient extent to enable, when pressure is applied thereupon, the convenient lowering of the inner or rear end of the frame 24 against the stress of the spring 42.

The driving shaft 29 will be equipped with a usual belt and hand wheel 45, the aforesaid eccentric 30, the eccentric 46 from which the rock shaft 47 will be actuated, a balance weight 48 in the form of a half disk, and an oblique eccentric 49 receiving the eccentric strap 50 and coöperating therewith to impart the proper movement, as hereinafter explained, to the looper 51. The belt and hand wheel 45 and balance weight 48 are usual in this art and require no special description. The eccentric 46 is rigid on the end of the driving shaft 29 and is connected by a strap 52 with the longitudinally reciprocatory rod 53 whose front end is pivotally connected by a pin 54 with the lower end of a crank arm 55, whose upper end is rigidly secured upon the end of the rock shaft 47, the purpose of the eccentric 46, rod 53 and crank arm 55 being to impart the proper rocking motion to the shaft 47 and the parts connected therewith. The shaft 47 is mounted in bearings at the front end of the arm 18 of the general frame of the machine, and upon its left hand end the said shaft 47 carries the said crank arm 55, while upon the right hand end of the said shaft 47 is secured the crank arm 56 carrying the needle 57 and also the bracket 58 having an eye to receive the thread with which the sewing will be performed, said thread passing through the said eye 59 of said bracket 58, and thence through the eye of the needle 57, which preferably will be curved, as in Fig. 1. The needle 57 under the rocking motion of the shaft 47 will perform its known motion, carrying the thread back and forth through the fabric, as shown.

Adjacent to the crank or needle carrying arm 56 is provided upon the shaft 47 a disk 60, shown in detail in Fig. 8, said disk being concentric with the shaft 47 except at one point where it is formed with a recess 61. The disk 60 having the recess 61 is provided to coöperate with the oscillatory needle guide 62 comprising an upper arm 63 and lower arm 64, said upper arm having a rounded end 65 to ride on said disk 60 and finally enter the recess 61 therein, while the lower arm 64 is equipped with a laterally projecting lip 66 extending below and close to the path of the needle 57. The needle guide 62 is mounted upon a pin 67 upon which it may have an oscillatory or rocking motion, as hereinafter explained, under the action of the disk 60 rigid upon the rock shaft 47, the movement of said rock shaft and said disk serving to carry the recess 61 in said disk back and forth against the end 65 of the said needle guide which results in said guide being rocked upon the said pin 67, whereby the lip 66 of said guide is first moved upward and forward in close relation to the needle 57 (where it is held until said needle has its point fairly within the fabric) and then is allowed to descend so as to carry its lip 66 out of the way of the approaching needle carrying arm 56, as shown in Fig. 8. The recess 61 is very slight in depth, and I have found in practice that a plain flat surface formed by cutting off the edge of the disk 60 answers substantially every purpose of said recess 61, the essential consideration being that the disk 60 shall operate as a cam to effect the proper movement of the guide 62, the upper end of the latter being held against said disk by means of a coiled spring 90.

The looper 51 is carried in the forward end of the looper rod 68 which comprises the bifurcated section 69, the threaded rod 70 and the frame 71, the threaded ends of the rod 70 engaging the adjoining ends of the said section 69 and frame 71 and rendering the looper rod 68, as a whole, adjustable as to its length. The looper 51 is secured in the front end of the said frame 71, and the said frame 71 is formed in two connected sections affording at their adjoining ends a socket 72 (Fig. 1) inclosing a ball 73 provided on the outer end of a crank pin 74 (Fig. 2), carried by the crank arm 75 which is integral with a hub 76 (Fig. 7) mounted upon a stud 77 carried by a horizontal rod or shaft 78 confined within a bearing aperture 79 formed in the lower end of a vertical post 80, the latter being held within a vertical aperture 81 in a portion of the arm 18 of the machine frame by means of a screw 82, said post 80 being vertically and angularly adjustable within said aperture 81 and being capable of being fastened in any adjusted position by means of the said screw 82. The socket 72 and ball 73 constitute a ball and socket joint which permits of the looper rod 68 having a proper longitudinal movement and also an angular movement, both of said movements being imparted to said looper rod 68 and looper 51 by means of the oblique eccentric 49 and eccentric strap 50, the latter engaging a groove in said eccentric and being pivotally secured by means of screws 84 to the rear ends of the bifurcated arms 85 constituting a part of the rear section 69 of the said looper rod 68. The crank 75 carrying the pin 74 having the ball 73 upon which the looper rod 68 is, by means of the socket bearing 72, supported at its front portion, does not perform a complete rotation but only an oscillatory motion, said crank arm 75 yielding back and forth with the thrust imparted to it by the looper rod 68 when the latter is actuated by the oblique eccentric 49. The crank arm 75 and its hub 76 turn upon the screw stud 77, and hence during the movement of the said crank arm 75 the horizontal rod or shaft 78 does not perform any movement. The crank arm 75 may be adjusted vertically, as above explained, by the adjustment of the post 80, and said crank arm 75 may also be adjusted laterally by the adjustment of the aforesaid rod or shaft 78 in the transverse aperture 79 of the post 80, a screw 83 (Fig. 7) being provided for securing the rod or shaft 78 in any position to which it may be laterally adjusted. The post 80 has an open vertical center to receive the screw 83, as shown. The adjustment of the crank arm 75 either vertically or laterally or in both directions will be for the purpose of enabling the looper 51 to perform its functions in a correct and the most efficient manner.

The looper 51 is of special construction and comprises the shank portion whose end is held in the frame 71 of the looper rod and the hook portion, numbered 91 in Figs. 12 and 14, which extends downwardly from the said shank portion and has its pointed end on a plane at substantially right angles to the longitudinal line of the said shank portion. The pointed end of the looper 51 has on one side the inclined shoulder 92 (Figs. 13 and 14), and upon its opposite side the shoulder 93, more clearly shown in Fig. 12. The thread used in sewing is lettered 94 and this thread in the formation of the loop, shown enlarged in Fig. 13, is spread open to receive the needle by means of the aforesaid shoulders 92 and 93 on the end of the looper, said shoulders inclining in opposite directions and said thread, as shown in Fig. 13, passing around the looper and lying against said shoulders 92, 93, which by being inclined in opposite directions will hold the loop in an open position, as shown, so that the needle may assuredly enter the same.

In Fig. 9 I have illustrated the looper, needle and thread, as in the act of sewing the hat sweat 95 to the fabric 96 of the hat, the needle in Fig. 9 being shown as having completed its forward thrust through the fabric and as having receded slightly from that position so as to create a small loop in the thread preparatory to the entrance into said loop of the point of the looper 51. As the needle recedes from its position, shown in Fig. 9, the looper 51 having engaged the thread will carry the same transversely of the path of the sewing needle and move the loop around to a position in which it is in line with the path of the sewing needle, as shown in Fig. 10, the point of the looper being then slightly below the path of said needle so that said needle may, on its forward thrust, pass closely over the point of the looper and enter the loop held open thereby, after which the looper will return to the position shown in Fig. 9 so as to again engage the loop exposed by the sewing needle after it has completed its forward thrust and started to recede from the fabric. The stitch formed by the needle and looper is not in itself new, but by the means described the stitch may be very accurately and rapidly formed, the looper of the construction described being adapted to correctly form the loop and hold it in such open condition that the needle 57 may properly and accurately enter the same.

The feature which very largely enables the rapid and correct sewing by means of the mechanism described is the fact that the looper is by means of the oblique eccentric 49, of the construction presented, enabled to have imparted to it a very rapid and uniform motion on a particular path, in which it is believed no looper of the prior art has been made to travel. In describing the path taken by the looper we may commence with the position in which the looper is shown in Fig. 9. From the position in which the looper is shown in Fig. 9, the point of the looper will move transversely to the path of the sewing needle and above the point of said needle, entering the loop in the sewing thread and continuing its transverse motion until the needle has receded to some extent from the fabric, whereupon and while the needle is receding the point of the looper will recede and then, as the needle again starts forward, the point of the looper will move in a direction transversely to the path of the needle and pass below said path so that the needle may move above but close to the point of the looper so as to enter the loop held open for its reception, as shown in Fig. 10, the looper then receding from said loop by continuing its transverse movement, and thereupon the point of the looper will become elevated and move substantially on the arc of a circle toward its first position shown in Fig. 9 preparatory to again engaging a loop of the thread. At the time the point of the looper is in the position in which it is shown in Fig. 9, it is close to the upper surface of the lip 41 of the presser-foot, and while the looper is passing from the position shown in Fig. 9 and carrying the loop, it performs an angular motion and becomes somewhat elevated from the aforesaid lip 41, but upon reaching its rear position preparatory to crossing the path of the sewing needle and shedding the loop, the point of the looper moves downwardly so that it may pass slightly below the path of the sewing needle, said looper during this time performing a slight angular movement, and thereupon the looper continues its angular motion and becomes elevated and moves forwardly over the said lip 41 and then descends slightly so as to assuredly enter the loop formed by the slight receding motion of the needle, the point of said looper then being in a position in which it is shown in Fig. 9. The path described by the looper is secured to it by means of the oblique eccentric 49 and the supporting crank pin 74 for the forward portion of the looper rod, said crank pin performing an oscillatory motion under the action of the looper rod, and said oblique eccentric serving not only to impart the forward and backward motion to the looper rod, but also a positive angular motion to said rod, the angular motion of the looper rod being permitted by the ball and socket joint 72, 73, at the outer end of the crank pin 74 and being caused by the rotation of the oblique eccentric 49 within the eccentric strap 50 and the consequent transverse rocking or oscillatory motion imparted to the pins 84 and through said pins to the arms 85 straddling said eccentric 49 and forming a part of the looper rod. The path described by the point of the looper, when viewed from above, is substantially in the outline of an ellipse and approximates a circular outline, but at the inner edge of the lip 41 of the presser-foot the point of the looper dips downwardly so as to pass slightly below the path of the sewing needle, and it is of importance that the looper describe the said elliptical or circular path because by reason thereof the machine may be driven at very high speed, the motion of the point of the looper being continuous on a substantially uniform line and not being compelled to describe an angular path nor any path requiring a divergence from the substantially uniform continuous line in the outline of a circle or an ellipse.

The looper rod 68 may be adjusted as to its length, as above described, and the action of the point of the looper may be adjusted to a nicety by the adjustment of the crank 75 carrying the pin 74 upon whose outer end the forward portion of the looper rod is supported, and this crank 75 may be adjusted in several different ways, as for instance, the said crank 75 may be adjusted in a vertical direction by raising or lowering the post 80 carrying at its lower end the shaft 78, and the said crank 75 may be adjusted laterally by the movement of the said shaft 78, the latter being adapted to be held in its adjusted position by means of the screw 83, and again the crank 75 may be adjusted a little further toward the front or the rear of the machine by the angular adjustment of the aforesaid post 80, the screw 82 being utilized to hold the post 80 in any position to which it may be moved either vertically or axially. The crank 75 extends upwardly from its hub 76 and its relation to the looper rod 68 is such that upon the rear stroke of said rod the said crank will turn rearwardly and downwardly far enough to permit the point of the looper to descend slightly below the path of the sewing needle and upon the forward stroke of the looper rod the said crank arm 75 swings frontwardly only far enough to allow the point of the looper to pass through the loop of the thread above the path of the said needle, the crank arm 75 thus not moving frontwardly and downwardly on the forward stroke of the looper rod to the same extent that it moves rearwardly and downwardly on the rear stroke of the looper rod.

The operation of the machine hereinbefore described will be largely understood from the foregoing explanations, and hence but a brief further reference to the operation of the machine will be necessary. When the machine is employed for sewing linings or sweat bands into hats, the crown of the hat will be pressed downward through the feed ring 25 and supporting frame 24 and the brim of the hat will be turned downward over the outer edges of the said ring 25. In order to facilitate the introduction of the hat to the feed ring 25 and below the lip 41 of the presser-foot, the operator will tilt the said ring and the frame 24 downwardly and rearwardly by pressing upon the handle 43 and compressing the spring 42, and after the hat has been introduced to position the spring 42 will maintain in a suitable manner the firm relation of the hat to the feed ring and presser-foot. The hat being in position and the machine being set in motion, the needle 57 will be caused to perform its motion from the driving shaft 29, rock shaft 47 and needle carrying arm 56, while at the same time the oblique eccentric 49 will drive the looper rod and the ordinary eccentric 30 will, through intermediate mechanism, impart an intermittent feed motion to the ring 25 and the hat held thereon. The feed ring 25 is driven by means of the pawl 33, and this pawl is given its motion from the eccentric 30, the rod 31 and rocking arm or frame 32. The movement of the sewing needle is not of unusual character and therefore requires no special description, and the motion of the looper has been so fully described hereinbefore as to require no further explanation at this place.

The feed ring 25 by having a toothed or roughened edge or surface to engage the hat and being positively driven from the driving shaft of the machine assures in a convenient and certain manner the correct feeding of the hat to the sewing needle.

What I claim as my invention and desire to secure by Letters Patent, is:—

1. In a sewing machine, suitable feed mechanism, the approximately horizontally arranged sewing needle, and means for actuating said needle, combined with the looper, the rod carrying said looper and arranged at right angles to the line of the seam to be produced, a pivoted swinging support pivotally receiving said rod and permitting it to have an angular motion, and a rotary oblique eccentric hub operatively connected with said rod for driving and angularly turning the same, said looper having a depending hook portion extending substantially at a right angle to the path of the needle and by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

2. In a sewing machine, suitable feed mechanism, the approximately horizontally arranged sewing needle, and means for actuating said needle, combined with the looper, the rod carrying said looper and arranged at right angles to the line of the seam to be produced, a pivoted swinging support pivotally receiving said rod and permitting it to have an angular motion, and a rotary oblique eccentric hub operatively connected with said rod for driving and angularly turning the same and said looper, said looper having the depending hook portion extending substantially at a right angle to the path of the needle, and the pointed end of said looper having the oppositely inclined shoulders to engage the opposite sides of the loop and hold the latter open to receive the needle, and said looper by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

3. In a sewing machine, suitable feed mechanism, the approximately horizontally arranged sewing needle, and means for actuating said needle, combined with the looper, the rod carrying said looper and arranged at a right angle to the line of the seam to be produced, a support for said rod adapted to permit said rod to have vertical pivotal, longitudinal and angular movements, and means for driving and angularly turning said rod and looper, said looper having the depending hook portion extending substantially at a right angle to the path of the needle, and the pointed end of said looper having the oppositely inclined shoulders to engage the opposite sides of the loop and hold the latter open to receive the needle; substantially as set forth.

4. In a sewing machine, suitable feed mechanism, the approximately horizontally arranged sewing needle, and means for actuating said needle, combined with the looper, the rod carrying said looper and arranged at right angles to the line of the seam to be produced, a support for said rod adapted to permit said rod to have vertical pivotal, longitudinal and angular movements, the rotary oblique eccentric hub on a driving shaft, and the yoke on said rod straddling said hub and operatively connected therewith to be driven and turned angularly thereby causing the looper to travel its path, said looper having the depending hook portion extending substantially at a right angle to the path of the needle and by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

5. In a sewing machine, suitable feed mechanism, the approximately horizontally arranged sewing needle, and means for actuating said needle, combined with the looper, the rod carrying said looper and arranged at right angles to the line of the seam to be produced, a support for said rod adapted to permit said rod to have vertical pivotal, longitudinal and angular movements, the rotary oblique eccentric hub on a driving shaft, the obliquely arranged loose strap on said hub, and the yoke on the looper rod straddling said hub and pivotally connected at its ends to said strap for enabling said hub to effect the aforesaid movements of said rod, said looper having the depending hook portion extending substantially at a right angle to the path of the needle and by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

6. In a sewing machine, suitable feed mechanism, the approximately horizontally arranged sewing needle, and means for actuating said needle, combined with the looper, the rod carrying said looper, a swinging crank arm carrying a crank-pin having a ball bearing thereon receiving and supporting said rod and permitting said rod to be turned angularly, and means for imparting longitudinal and angular motion to said rod, said looper by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

7. In a sewing machine, suitable feed mechanism, the approximately horizontally arranged sewing needle, and means for actuating said needle, combined with the looper, the rod carrying said looper and arranged at a right angle to the line of the seam to be produced, a rotary oblique eccentric operatively connected with said rod for driving and angularly turning the same and said looper to compel said looper to travel its path, the oscillatory upwardly turned crank having a pin upon which the forward portion of the looper rod is swiveled and supported, and means for supporting said crank, said upwardly turned crank having such initial relation to said looper rod that said looper will descend more greatly on one stroke of the looper rod than on the other stroke of same, and said looper at its pointed end being adapted to take the loop from above the needle and carry it to an opposite position with the point of the looper then below the needle for the entrance of said needle to said loop, and said looper by reason of the construction and arrangement herein defined being adapted to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

8. In a sewing machine, suitable feed mechanism, the approximately horizontally arranged sewing needle, and means for actuating said needle, combined with the looper, the rod carrying said looper, means for driving and angularly turning said rod and looper to compel the point of the latter to travel its path, the oscillatory crank having a pin on which the forward portion of the looper rod is swiveled and supported, the transverse rod or shaft having at its end a stud supporting said crank, and the vertically adjustable post carrying said shaft, said looper at its pointed end being adapted to take the loop from above the needle and carry it to an opposite position with the point of the looper then below the needle for the entrance of said needle to said loop; substantially as set forth.

9. In a sewing machine, suitable feed mechanism, the approximately horizontally arranged sewing needle, and means for actuating said needle, combined with the looper, the rod carrying said looper, means for driving and angularly turning said rod and looper to compel the point of the latter to travel its path, the oscillatory crank having a pin on which the forward portion of the looper rod is swiveled and supported, the transverse rod or shaft having at its end a stud supporting said crank, and the vertically adjustable post receiving and carrying said shaft and permitting of the adjustment of the same transversely of the machine, said looper at its pointed end being adapted to take the loop from above the needle and carry it to an opposite position with the point of the looper then below the needle for the entrance of said needle to said loop; substantially as set forth.

10. In a sewing machine, suitable feed mechanism, the approximately horizontally arranged sewing needle, and means for actuating said needle, combined with the looper, the rod carrying said looper, means for driving and angularly turning said rod and looper to compel the point of the latter to travel its path, the oscillatory crank having a pin on which the forward portion of the looper rod is swiveled and supported, the transverse rod or shaft having at its end a stud supporting said crank, the vertically and angularly adjustable post carrying said shaft, means carried by said post for securing said shaft in its transverse adjustments, and means for securing said post in its vertical and angular adjustments, said looper at its pointed end being adapted to take the loop from above the needle and carry it to an opposite position with the point of the looper then below the needle for the entrance of said needle to said loop; substantially as set forth.

11. In a sewing machine, suitable feed mechanism, the approximately horizontally disposed sewing needle, the rock-shaft having a crank arm carrying said needle, the looper, and means for actuating said shaft and said looper, combined with the pivoted needle guide 62, the disk 60 on said shaft and having a cam surface, and means for retaining the upper end of said needle guide against said disk, said guide comprising the upper and lower members 63, 64, and lip 66, and said disk under the action of said shaft serving to permit at the proper time, the lowering of said lip for enabling it to escape from the then approaching needle carrying arm; substantially as set forth.

12. In a sewing machine, the reciprocating needle passing transversely to the line of feed, a presser foot, a feed mechanism, and means for actuating the needle and feed mechanism, combined with the looper rod, the looper carried by said rod and having the depending hook portion extending substantially at a right angle to the path of the needle, and the rotary oblique eccentric hub for driving and angularly turning said rod and causing said looper to travel on an approximately circular path, the point of the looper commencing at a definite position, first moving transversely to the path of the needle and above the point of the needle to enter the loop, then continuing its transverse movement until the needle has receded to some extent from the fabric, then receding as the needle recedes, and then, as the needle again starts forward, moving in a direction transversely to and below the path of the needle to hold the loop in position for the needle to enter it, and then receding from said loop by continuing its transverse movement, whereupon the point of the looper will become elevated and move substantially on the arc of a circle towards its first position or point of beginning; substantially as set forth.

Signed at New York, in the county of New York, and State of New York, this 8th day of July A. D. 1902.

CHARLES A. DEARBORN.

Witnesses:
CHAS. C. GILL,
ARTHUR MARION.